J. A. DAVIS.

TURN TABLE FOR TALKING MACHINES.

APPLICATION FILED JAN. 31, 1920.

Reissued Mar. 23, 1920. 14,823.

Witness

Chas. L. Griesbauer

Inventor

John A. Davis,

By Nartwell McCaitney

Attorney

UNITED STATES PATENT OFFICE.

JOHN A. DAVIS, OF THE UNITED STATES NAVY.

TURN-TABLE FOR TALKING-MACHINES.

14,823. Specification of Reissued Letters Patent. Reissued Mar. 23, 1920.

Orignal No. 1,298,019, dated March 25, 1919, Serial No. 113,504, filed August 7, 1916. Application for reissue filed January 31, 1920. Serial No. 355,364.

*To all whom it may concern:*

Be it known that I, JOHN A. DAVIS, of the United States Navy, a citizen of the United States of America, and whose post-office address is Navy Department, Washington, D. C., have invented new and useful Improvements in Turn-Tables for Talking-Machines, of which the following is a specification.

My invention has for its object a new and improved turn table for talking machines and particularly for electrically operated machines although it may be used with equal success on those which are mechanically operated.

At the present time many talking machines are operated by electric motors the current for which is taken from the ordinary lighting circuit. This method of operation has certain obvious advantages but serious difficulties have arisen, particularly as the result of the use of metallic turn tables on which the records are placed. The noise of the driving mechanism is transmitted through the spindle to the metallic turn table which being resonant tends to magnify it and distribute it thus increasing the objectionable noise. The vibrations of the resonant turn table are to some extent transmitted to the record and thus through the needle to the sound box interfering with the reproduction of the record and the purity of the tone therefrom and introducing extraneous noises into the sound reproduction.

Furthermore as electrically operated talking machines are arranged for connection with the ordinary lamp circuit which is commonly 110 or 220 volts and as there is always danger of a short circuit in the instrument, there is danger of an electric shock to any one touching a metallic turn table which is in electrical connection through the spindle with the other metallic parts of the instrument. There is also equal danger of fire from a short-circuit.

Accordingly my invention has for its object a new and improved turn table which overcomes completely the various objections previously mentioned.

The turn table embodying my invention is molded from a suitable insulating compound such for instance as one in which pulverized asbestos, mica, gum shellac and asphaltum are ingredients. This material is plastic when heated and is capable of being molded under heavy pressure and on cooling is rigid, strong, hard and an insulator capable of withstanding a relatively high voltage.

The turn table embodying my invention also contains other important features which contribute to its usefulness and the ease with which it may be manufactured.

The invention will be fully understood from the following description when taken in connection with the accompanying drawings and the novel features thereof will be pointed out and clearly defined in the claims at the close of this specification.

In the drawings, Figure 1 is a top plan view of a turn table embodying my invention.

Figure 1:
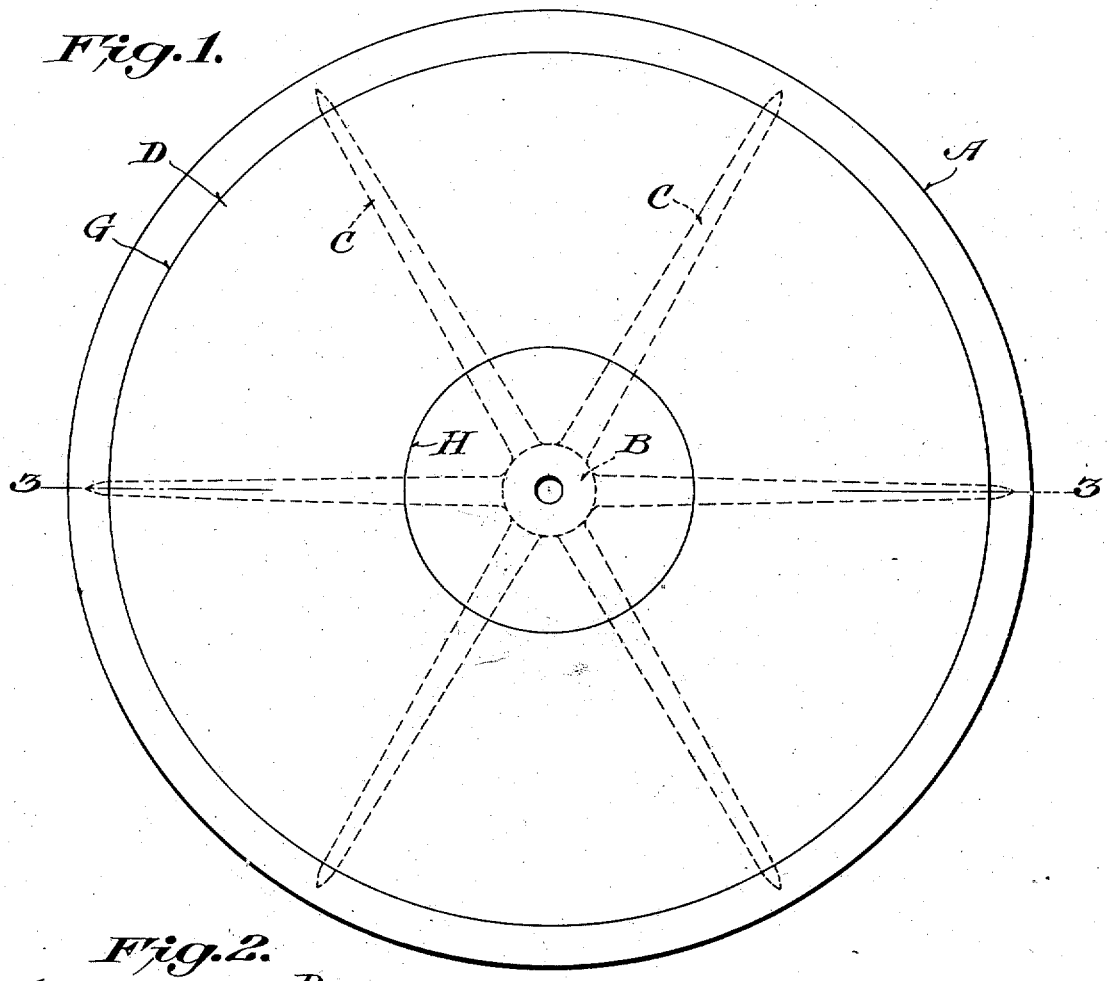
Figure 2:
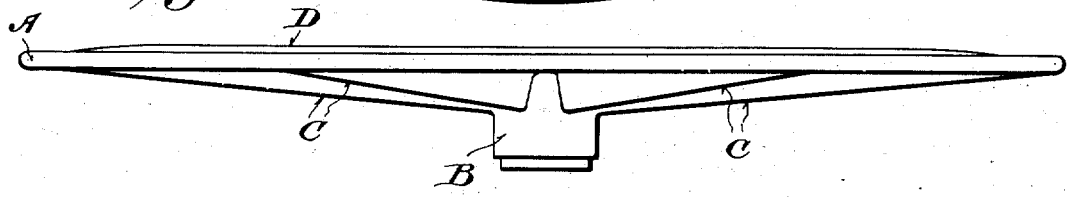
Fig. 2 is a side elevation of the same.
Figure 3:
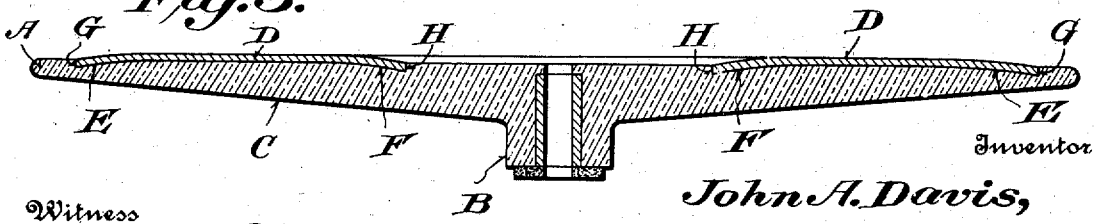
Fig. 3 is a section on line 3—3 of Fig. 1.

Referring to the drawings, there is shown at A the disk portion of the turn table and at B the hub. The underside of the disk is stiffened by ribs C which connect with the hub and increase the rigidity of the finished structure so that it can not be sprung if dropped or leaned upon when in place upon the spindle of the machine with which it is used. These parts are molded integral from the insulating material chosen as for instance the plastic composition mentioned above. The upper side of the turn table is covered with felt D on which the record rests. This felt serves to make a frictional contact between the turn table and the record. In my preferred form, I provide an annular piece or ring of felt which extends from a point a short distance inside of the circumference of the turn table to a point from one to three inches from the center of the disk A. I also form an annular depression E in the surface of the turn table underneath the outer edge of the disk of felt and another annular depression F underneath the inner edge of the felt thereby causing the edges of felt to lie slightly below the plane of the surface of the turn table. The main portion of the felt is above the level of the turn table. It is to be noted by reference to Fig. 3 that the outer edge of the depression E forms a shoulder G, while the approach to the shoulder G has a gradual slope. Similarly the inner edge of the depression F forms a shoulder H, while the approach to said shoulder has a gradual slope. The edges, therefore, of the felt disk D are entirely below the general surface of the table, the edges of the felt both on the inner periphery and the outer periphery abutting up against the shoulders H and G respectively, leaving no exposed portion whatever of the edge. Thus the upper surface of the felt has a sort of crowned effect and the felt is enabled to support the record free from any contact whatever with the composition body of the table, although there are no upwardly projecting shoulders or nubs. This construction enables the felt to be applied to the turn table more smoothly and rapidly and it is less likely to become unsecured around its edges and to work up as has heretofore been the case. It also makes it easier to put the record in place or to remove it, as the edge of the record is not in contact with the turn table.

Since the turn table is made of insulating material, the current by which the electric motor is operated cannot be transmitted through the turn table to the operator or to any article which may be in contact with the turn table thus eliminating the danger of fire and increasing the safety of the user of the machine. Since the insulating material of which the turn table is constructed is nonresonant, sounds generated in the instrument are not transmitted through the spindle and increased and distributed by the turn table. The sound reproduction is not interfered with by vibration of the turn table transmitted to the record and thence through the needle to the sound box. Furthermore, in case the instrument below the turn table becomes charged with static electricity, as may be the case particularly in cold weather, the charge can not be communicated to the sound box to the injury of the tone reproduction.

What I claim is:—

1. A turn table for talking machines, the body portion of which consists of a disk having in the upper surface two annular depressions which are concentric with each other and with the periphery of the disk, one of said depressions being located at some distance inside of the margin of the disk, the other of said depressions being located at a considerable distance nearer the center of the disk, the outer depression having an abrupt shoulder at its outer periphery, the bottom of the depression having a gradual slope from its inner to its outer edge, the inner depression having an abrupt shoulder at its inner edge, the bottom of said depression having a gradual slope from its outer periphery to its inner periphery, and an annular piece of felt secured to the surface of the table disk covering the space between the shoulders of said two depressions, the inner and outer edges of said felt lying within said depressions so that the edges of the felt do not project above the shoulders formed by the depressions in the table disk.

2. A turn table for talking machines, the body portion of which consists of a disk having in its upper surface an annular depression which is concentric with the periphery of the disk and which is located toward the inner part of the disk, the bottom of said depression having a gradual slope, and a circular strip of felt secured to the surface of the disk and having its edge lying within said depression so as not to project above said disk surface, the main portion of the felt being disposed above the plane of said surface.

3. A turn table for talking machines, the body portion of which consists of a disk having in the upper surface an annular depression which is concentric with the peripheral edge of the disk and which is located at a slight distance inside of said peripheral edge, said depression having an abrupt shoulder at its outer periphery, the bottom of the depression having a gradual slope from its inner to its outer edge, and a circular strip of felt secured to the surface of the disk and having its outer edge lying within said depression so that its said edge does not project above the shoulder formed by the depression.

4. A turn table for talking machines, the body portion of which consists of a disk having in its upper surface an annular depresson which is concentric with the periphery of the disk, said depression having an abrupt shoulder at one of its peripheral edges, the bottom of said depression having a gradual slope away from said shoulder, and a circular strip of felt secured to the surface of the disk and having an edge thereof lying within said depression, so that the said edge of the strip does not project above the shoulder formed by the depression.

In testimony whereof I affix my signature.

JOHN A. DAVIS.